United States Patent
Sevindik et al.

(10) Patent No.: US 11,272,428 B1
(45) Date of Patent: Mar. 8, 2022

(54) TIME INTERLEAVED COVERAGE ZONES IN WIRELESS NETWORKS

(71) Applicant: CHARTER COMMUNICATIONS OPERATING, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 8 days.

(21) Appl. No.: 16/999,606

(22) Filed: Aug. 21, 2020

(51) Int. Cl.
*H04W 48/08* (2009.01)
*H04W 28/02* (2009.01)
*H04W 72/04* (2009.01)

(52) U.S. Cl.
CPC ....... *H04W 48/08* (2013.01); *H04W 28/0268* (2013.01); *H04W 72/0446* (2013.01)

(58) Field of Classification Search
CPC ............. H04W 28/0268; H04W 48/08; H04W 72/04; H04W 72/0426; H04W 72/0446; H04W 72/046; H04W 76/11
See application file for complete search history.

(56) References Cited

U.S. PATENT DOCUMENTS

2012/0220288 A1* 8/2012 Huber ............... H04W 28/0268
455/422.1
2018/0103478 A1* 4/2018 Wang .................... H04W 76/11

* cited by examiner

*Primary Examiner* — Ronald Eisner
(74) *Attorney, Agent, or Firm* — Meagher Emanuel Laks Goldberg & Liao, LLP

(57) ABSTRACT

Various embodiments comprise systems, methods, architectures, mechanisms and apparatus for creating coverage zones (CZs) at a Citizens Broadband Radio Service Device (CBSD) nodes where each CZ is defined by a respective Physical layer Cell Identity (PCI), and each CZ is allocated a respective time slot having a duration selected in accordance with a type of wireless device (WD) to be supported by the CZ, and each CZ communicates during its respective time slot via some or all of the antennas or antenna sections (e.g., coverage areas or sections S1-S3) of the node such that the node communicates with different types of WD in a time-interleaved manner via some or all of the coverage areas associated with the node.

26 Claims, 3 Drawing Sheets

TIME INTERLEAVED COVERAGE ZONES IN WIRELESS NETWORKS

FIELD OF THE DISCLOSURE

The present disclosure generally relates to wireless communications systems and related networks, and more particularly to dynamically allocating spectrum at provider equipment (PE) supporting a radio access network (RAN).

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Operators of mobile systems, such as Universal Mobile Telecommunications Systems (UMTSs), Long Term Evolution (LTE), and 5th Generation New Radio (5G-NR) described and being developed by the Third Generation Partnership Project (3GPP), are increasingly relying on wireless macrocell radio access networks (RANs) such as traditional cellular base stations, eNodeBs and the like, along with wireless small cell or microcell RANs in order to deploy, for example, indoor voice and data services to enterprises and other customers. For both macrocell RANs and small/micro cell RANs, increasing demands for wireless throughput make access to additional wireless spectrum desirable.

An example of additional spectrum which is becoming available is that of the citizens broadband radio service (CBRS), a 150 MZ band between 3.55 GHz and 3.70 GHz. Access is currently granted to Citizens Broadband Radio Service Devices (CBSDs) operating according to a Generic Authorized Access (GAA) from 3.55 GHz to 3.65 GHz, with full access to 3.70 GHz expected in the future.

SUMMARY

Various deficiencies in the prior art are addressed by systems, apparatus, and methods for creating coverage zones (CZs) at a Citizens Broadband Radio Service Device (CBSD) nodes where each CZ is defined by a respective Physical layer Cell Identity (PCI), and each CZ is allocated a respective time slot having a duration selected in accordance with a type of wireless device (WD) to be supported by the CZ, and each CZ communicates during its respective time slot via some or all of the antennas or antenna sections (e.g., coverage areas or sections S1-S3) of the node such that the node communicates with different types of WD in a time-interleaved manner via some or all of the coverage areas associated with the node.

A method according to an embodiment for defining coverage zones at provider equipment (PE) configured for wireless communication via a shared use spectral region managed by a Spectrum Access System (SAS) comprises registering the PE with a Spectrum Access System (SAS); at the PE, transmitting a common physical cell identity (PCI) from each of a plurality of available sectors; at the PE, creating a first coverage zone by transmitting a selected first PCI to each of the plurality of available sectors during a first time slot; at the PE, creating a second coverage zone by transmitting a selected second PCI to each of the plurality of available sectors during a second time slot; wherein each coverage zone is configured for use by a respective type of equipment.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
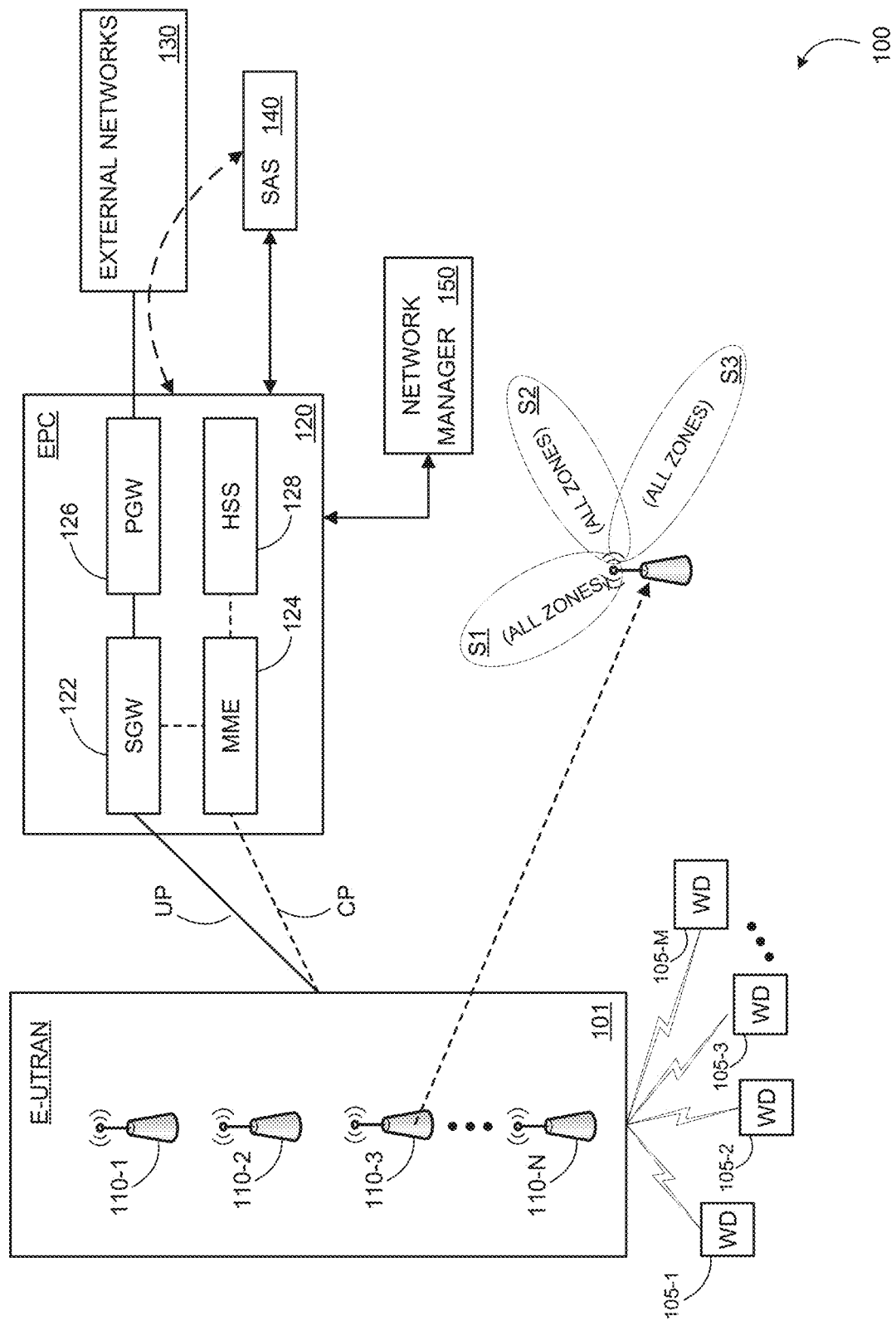
FIG. 1 graphically depicts a portion of a wireless network useful in illustrating a problem addressed by the various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Mobile network providers desire to provide optimal cellular coverage for users of cellular/mobile network services. Mobile network providers have deployed universal mobile telecommunications system (UMTS) nodes and/or high speed packet access (HSPA) nodes to provide coverage to the users of their network. These deployments have been augmented by the deployment of third generation partnership project (3GPP) long term evolution (LTE) coverage (e.g., 4G/LTE) to increase network performance, provide new services and so on. New and planned deployment of 5G New Radio (5G NR) and related technologies provides further improvements in network performance as well new or improved network services.

The various embodiments will primarily be discussed within the context of a 3GPP LTE mobile network utilizing compatible provider equipment (PE) and wireless devices (WD) such as user equipment (WD). However, it will be appreciated by those skilled in the art and informed by the present teaching that the various embodiments are applicable to older mobile network technologies, and especially well-suited for use in the present and upcoming deployments of 5G cellular network equipment and the use of such equipment to support both existing and new network services. As such, it is contemplated that the various embodiments disclosed herein are applicable to all of the current and currently contemplated mobile and cellular networking technologies, services and applications.

FIG. 1 depicts a simplified network services architecture suitable for use in various embodiments. Specifically, wireless devices (WD) 105-1 through 105-M (collectively WD 105) are depicted as communicating with one or more of nodes 100-1 through 110-N (collectively nodes 110), the nodes 110 forming a E-UTRAN (LTE access network) 101 which is connected to an evolved packet core (EPC) 120 so as to provide thereby network services, such as from/to external networks 130.

The nodes 110 may comprise macrocells, small cells, microcells and the like such as eNodeBs, cellular network base stations, 4G/5G repeaters, and similar types of provider equipment. The wireless devices (WD) 105 may comprise any type of wireless device configured for use in accordance with the various embodiments, such as user terminals (e.g., mobile phones, laptops, tablets and the like), fixed wireless access devices (e.g., set top boxes, digital video recorders, stationary computing devices and the like), Internet of Things (IoT) devices (e.g., sensors, monitoring devices, alarm system devices and the like), and/or other wireless devices.

The nodes 110 are configured to communicate with wireless devices (WD) 105 as discussed herein. While the nodes 110 and WD 105 may operate in accordance with various radio access technologies (RATs), the embodiments will be discussed within the context of those nodes 110 and WD 105 configured to communicate with each other as Citizens Broadband Radio Service Devices (CBSDs) configured for operation within the Citizens Broadband Radio Service (CBRS), such as the 100 MHz band from 3.55 GHz to 3.65 GHz, the 150 MZ band between 3.55 GHz and 3.70 GHz, or some other spectral range as defined by the relevant authorities.

As depicted, the EPC 120 comprises four network elements; namely, a Serving Gateway (SGW) 122, a Mobility Management Entity (MME) 124, a Packet Data Network (PDN) Gateway (PGW) 126, and a Home Subscriber Server (HSS) 128.

The SGW 122 and PGW 126 handle user data or user plane (UP) functions; they transport the internet protocol (IP) data traffic (i.e., incoming and outgoing packets) between the User Equipment (WD) 105 and the external networks 130. The external networks 130 may comprise any external network, such as an IP Multimedia Core Network Subsystem (IMS).

The SGW 122 is a point of interconnect between the radio-side (e.g., via a backhaul connection to the E-UTRAN 101 as depicted or some other wireless network) and the EPC 120. As its name indicates, this gateway serves the WD by routing the incoming and outgoing IP packets. The SGW 122 is the anchor point for intra-LTE mobility (i.e. in case of handover between eNodeBs 110) and between LTE and other 3GPP accesses. The SGW 122 is logically connected to the PGW 126.

The PGW 126 is the point of interconnect for routing packets between the EPC 120 and external packet data networks (e.g., Internet Protocol (IP) networks) 330. The PGW also performs various functions such as IP address/IP prefix allocation, policy control and charging, and other functions.

The MME 124 and HSS 128 handle user signaling or control plane (CP) functions; they process signaling related to mobility and security for E-UTRAN 101 access. The MME 124 is responsible for the tracking and the paging of WD in idle-mode. It is the termination point of the Non-Access Stratum (NAS). The HSS 128 comprises a database that contains user-related and subscriber-related information, and provides support functions in mobility management, call and session setup, user authentication, access authorization, and other functions. It is noted that the SGW 122 may also be used to handle some control plane signaling in various configurations.

An EPC control plane signaling path CP may be used to provide information such as WD messages or signaling may be provided to the MME 124 or SGW 122. The MME 124 may also interact with various other EPC nodes such as the HSS 128 and SGW 122 to determine information helpful in generating reports and/or providing other information for managing the various networks in implementing the embodiments described herein.

As depicted in FIG. 1, the EPC 120 communicates with a network manager 150, illustratively a general purpose computer server, network operations center (NOC) or other provider equipment configured to perform various network management functions such as described herein with respect to the embodiments. For example, WD statistics received by the EPC 120 such as by the MME 124 may be provided to the network manager 250 for further processing. Similarly, configuration of the nodes 110 may be guided or controlled by the network manager 150, such as the selection of operating parameters for the various coverage areas, coverage zones and the like as discussed in more detail below (e.g., avoid or mitigate interference between adjacent/overlapping node coverage areas or coverage zones).

As depicted in FIG. 1, a Spectrum Access System (SAS) 140 communicated with the EPC 120 and is configured to control access to the CBRS frequency band for RANs and other CBSD devices such as nodes 110 and WDs 105. Generally speaking, the SAS 140 is configured to ensure that the CBRS frequency band is allocated in accordance with the regulations promulgated by the relevant authorities. The SAS 140 may also communicate with the network manager 150 to perform various tasks in accordance with the embodiments. The SAS 140 generally communicates with CBSDs via an Operations and Maintenance (O&M) interface supported by the SGW 122 or PGW 126 of the EPC 120. While depicted as directly communicating with the EPC 120, in various embodiments the SAS 140 is remotely implemented and in communication with the EPC 120 via the external networks 130 (dashed line in FIG. 1), optionally using a TCP Proxy to hide the topology to further secure the network and other reasons.

Various elements or portions thereof depicted in FIG. 1 and having functions described herein are implemented at least in part as computing devices having communications capabilities, including for example the WDs 105, nodes 110, SAS 140, NM 150, WAP 160 and various portions of the EPC 120. These elements or portions thereof have computing devices of various types, though generally including a processor element (e.g., a central processing unit (CPU) or other suitable processor(s)), a memory (e.g., random access memory (RAM), read only memory (ROM), and the like), various communications interfaces (e.g., interfaces enabling communications via different networks/RATs), input/output interfaces (e.g., GUI delivery mechanism, user input reception mechanism, web portal interacting with remote workstations and so on) and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

CBSD Registration & Deregistration

Generally speaking, before a new CBSD (e.g., a node 110 being added to the network 101) can transmit in the CBRS frequency band, it needs to register with the SAS 140. The CBSD sends a registration request to the SAS 140 containing information about its installation parameters, such at the owner, location, and transmit characteristics of a node 110. The SAS 140 responds to the CBSD with a registration response. If the SAS 140 approves the registration request, then the SAS 140 will respond with a CBSD ID, and the CBSD is registered. If the SAS 140 rejects the registration request, then the SAS 140 will respond with an error message. The CBSD needs to correct the error and send another registration request.

Normally the CBSD requires CPI validation. In a single-step registration process, the CPI provides the installation parameters of the CBSD (signed with its own CPI certificate) to the CBSD. Then, the CBSD sends a registration request to the SAS including the signed installation parameters in a "cpiSignatureData" field. In a multi-step registration process, the CPI uses the SAS Portal (or another user interface that's integrated with the SAS Portal) to send the installation parameters to the SAS. Then, the CBSD sends a registration request to the SAS without installation parameters. The SAS combines the information from the SAS Portal and the CBSD to process the registration request.

If a CBSD needs to be decommissioned or simply moved, it will first send a deregistration request to the SAS. Thereby indicating that the CBSD no longer wishes to be listed in the SAS with the parameters that it sent in its registration request.

If a CBSD subsequently needs to transmit again, then the CBSD may send a registration request with updated parameters later.

Therefore, in operation a CBSD such as a node 110 registers with the SAS 140 (directly or via PE such as the network manager 150) by providing the SAS 140 with location and capability information as discussed above.

A wireless device (WD) such as a user terminal, fixed wireless access device, or IoT device waits for authorization from its corresponding CBSD (e.g., corresponding node 110) before transmitting in the CBRS frequency band. Each CBSD such as a node 110 operating within the CBRS frequency band will transmit and receive wireless data within one or more respective coverage areas as discussed above, wherein some of the coverage areas may be overlapping.

Coverage Zones

FIG. 1 also depicts a graphical representation of a node (e.g., node 110-3) having three directional antenna sections to provide thereby three directional coverage areas or sections (denoted as S1-S3). It is noted that any of the nodes 110 may have more or fewer antennas or antenna sections to provide thereby more or fewer directional coverage areas or sections. As will be described below, each of the sections S1-S3 conveys signal for all of a plurality of coverage zones to be defined for use by a node 110.

The various embodiments provide systems, apparatus, and methods for creating coverage zones (CZs) at a Citizens Broadband Radio Service Device (CBSD) nodes where each CZ is defined by a respective Physical layer Cell Identity (PCI), and each CZ is allocated a respective time slot having a duration selected in accordance with a type of wireless device (WD) to be supported by the CZ, and each CZ communicates during its respective time slot via some or all of the antennas or antenna sections (e.g., coverage areas or sections S1-S3) of the node such that the node communicates with different types of WD in a time-interleaved manner via some or all of the coverage areas associated with the node.

Referring to the example of FIG. 1, the node 110-3 comprises three antennas (or sections) radiating in three directions with little or no overlap. In this "three sector" deployment model, each sector has different PCI associated with it. Each PCI is unique, and identifies a base station or a sector of a base station.

A coverage zone is a defined region that provides coverage, and is identified by a single PCI. Each sector transmits the same PCI for a very short duration of time. And coverage zones are created for a very short duration of time. And, CBSD uses some (preferably all) of the available bandwidth in a single coverage zone. Advantageously, rather than dividing the available bandwidth between different sectors (e.g., ⅓ of 100 MHz of available spectrum allocated in a non-overlapping manner to each of the three sectors S1-S3), the various embodiments utilize the available spectrum in each of the different sectors, wherein a time division or slotted arrangement is used to enable communications with WD of a particular type within a particular time slot.

Figure 3A:
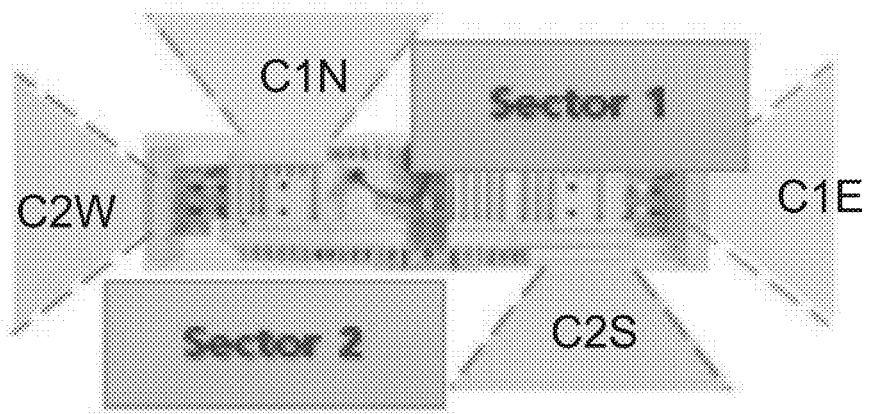
FIG. 3A graphically depicts a two-sector configuration for a cable strand based deployment according to an embodiment.

FIG. 3A graphically depicts a two-sector configuration for a cable strand based deployment according to an embodiment. Specifically, FIG. 3A depicts a two-sector configuration for small cells, nodes, CBSDs and the like to be mounted along the cable strand (e.g., back haul network path) of a network services provider, such as a mobile telecommunications company, multiple system operator (MSO) and the like. For example, an MSO having a service footprint covering a large urban area may have interconnected backhaul networking equipment deployed throughout the area such that multiple CBSDs may be installed along the interconnection paths to provide thereby wireless networking services to customers as discussed herein. The depicted two-sector configuration contemplates a first sector providing distinct north and east facing directional coverage areas or sections (C1N, C1E), and a second sector providing distinct south and west facing directional coverage areas or sections (C2S, C2W). The two sectors (C1, C2) and/or their respective sections (C1N, C1E, C2S, C2W) may be used individually or in combination to implement multiple PCI-defined coverage areas.

Figure 3B:
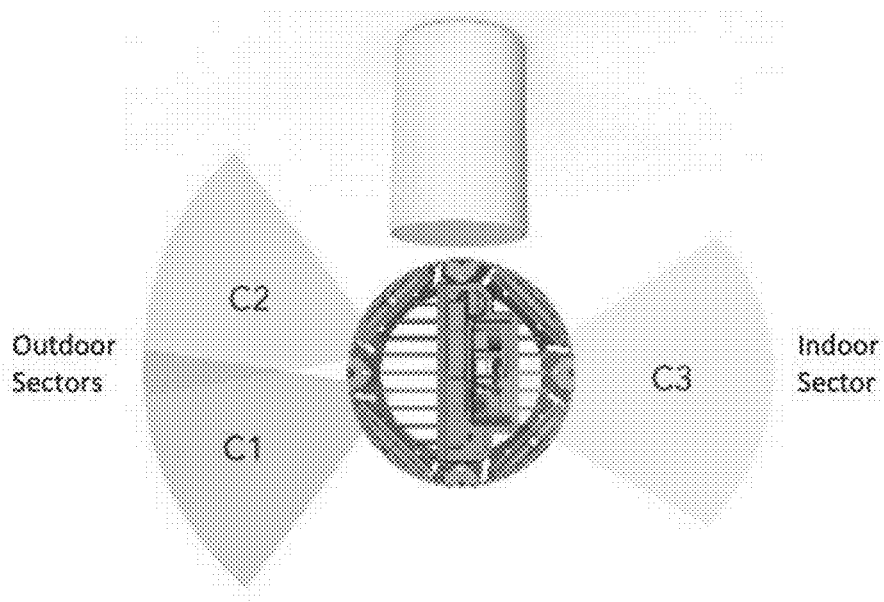
FIG. 3B graphically depicts a three-sector configuration for a SMB deployment according to an embodiment.

FIG. 3B graphically depicts a three-sector configuration for a small- and medium-sized business (SMB) or home deployment according to an embodiment. FIG. 3B depicts a three-sector configuration for small cells, nodes, CBSDs and the like to be mounted proximate a business or home served by a network services provider, such as a MSO. For example, an MSO providing services to SMB or home subscribers already has provider equipment deployed at the location such that one or more CBSDs may be installed using the deployed equipment to provide thereby wireless networking services to customers as discussed herein. The depicted three-sector configuration contemplates two different outdoor-facing directional coverage areas or sectors (C1, C2) and one indoor-facing directional coverage areas or sector (C3). The three sectors (C1, C2, C3) may be used individually or in combination to implement multiple PCI-defined coverage areas.

In various embodiments, a sequence or group (even a very large group) of such small cells, nodes, CBSDs and the like are deployed along a backhaul network path, other network path, SMB/home subscribers, and/or other locations having deployed provider equipment to form thereby a multiple-node wireless network capable of providing network services such as voice, data, and sensor reporting to subscriber wireless devices. The multiple-node wireless network may also provide seamless subscriber handoff functions for subscribers moving between coverage areas of different nodes of the multiple-node wireless network. In various embodiments, the sectors, sections, and PCI-defined coverage areas are determined by the SAS 140 or network manager 150 with respect to "on the ground" conditions of the various elements forming the multiple-node wireless network, such as to avoid inter-element or intra-element interference, to compensate for interfering effects of terrain topology, building size/materials, and/or other factors.

Figure 2:
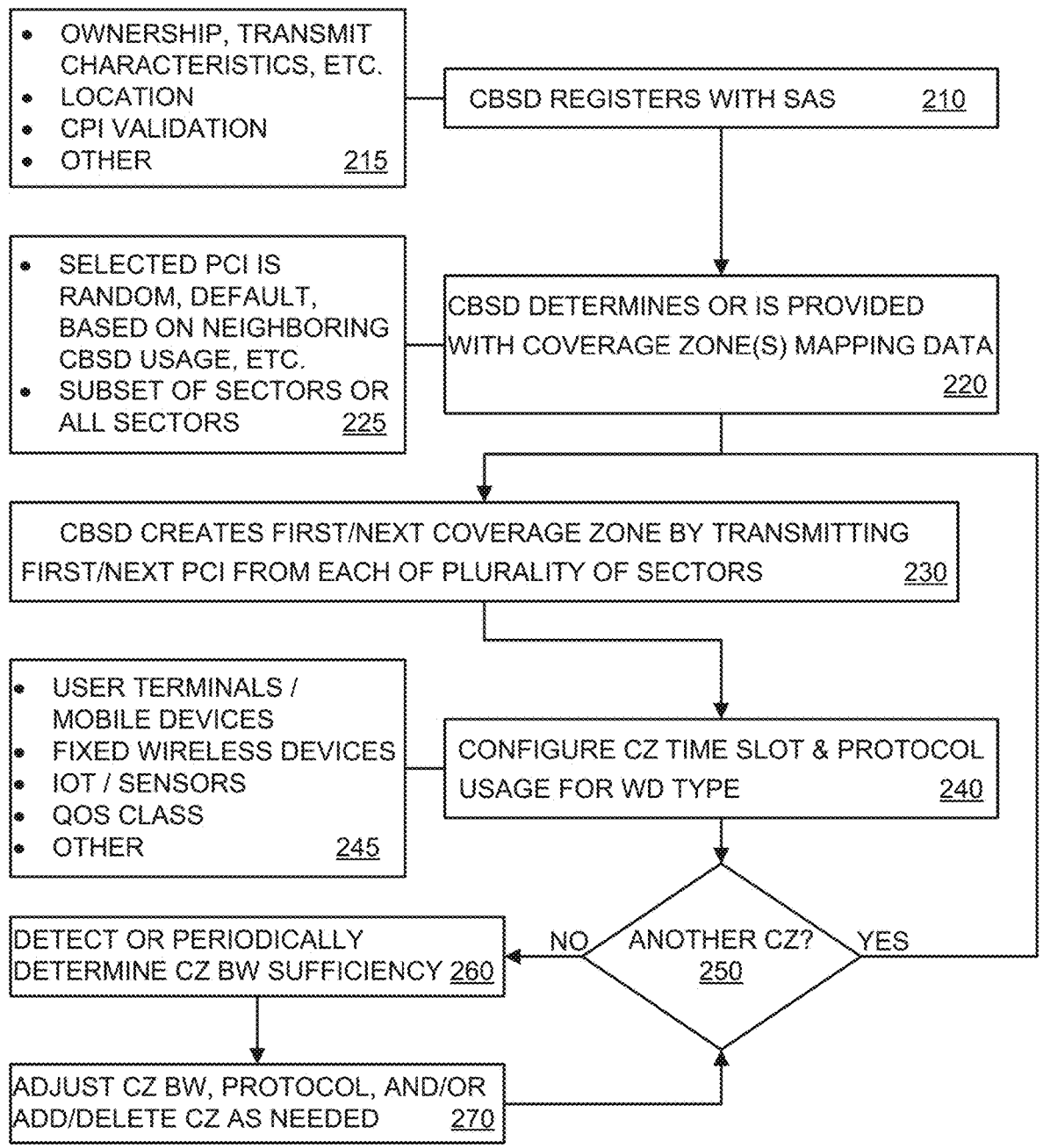
FIG. 2 depicts a flow diagram of a coverage zone creation and maintenance method according to an embodiment.

FIG. 2 depicts a flow diagram of a coverage zone creation and maintenance method according to an embodiment. Specifically, FIG. 2 depicts a flow diagram of a method 200 suitable for use by a CBSD such as a node 110 as depicted above with respect to FIG. 1.

At step 210, a CBSD (e.g., a node 110) registers with a SAS (e.g., SAS 140) as described above. Referring to box 215, the CBSD provides to the SAS information such as ownership, transmit characteristics, location, CPI validation and/or other information suitable for use in registering the CBSD with the SAS for the purpose of communicating via the CBRS spectral region.

At step 220, the CBSD determines or is provided with coverage zone mapping data to be implemented at the CBSD (e.g., received from SAS 140, network manager 150 or other management entity). That is, each CBSD determines or is provided with a respective coverage zone map that the CBSD used to implement the coverage zones as described herein with respect to the various embodiments. Each coverage zone is associated with a respective PCI and may comprise some or all of the sectors. Referring to box 225, the PCI to be transmitted for a particular coverage zone may be randomly selected, a default selection, a selection based on neighboring CBSD usage/operation, or selected in some other manner. Further, the number of sectors used for transmission of the PCI (i.e., the number of sectors in the coverage zone associated with that PCI) may comprise a subset of the sectors or all of the sectors.

At step 230, the CBSD creates a first or next coverage zone (CZ) by transmitting a first or next PCI from each of the plurality of sectors. That is, the CBSD uses the coverage zone mapping data to iteratively create each of the first and any subsequent coverage zones. For example, referring to node 110-3 as depicted in FIG. 1, a first-selected PCI (e.g., a PCI 100 selected out of a PCI range from 0 through 503) is transmitted from each of the three sectors S1-S3 so as to alert any WD within range of a particular sector that a CBSD is available to them.

At step 240, the CBSD configures the CZ created at step 230 according to time slot, protocol (if needed/different) and the like as appropriate for the type of WD intended to communicate via the CZ. Referring to box 245, the WD type may comprise a user terminal (mobile device) type, a fixed wireless device type, an IoT device type, Quality of Service (QoS) class, or some other device type or service requirement.

In various embodiments a protocol associated with communications via at least one time slot (i.e., one PCI-defined coverage area) is periodically adjusted in response to a determination that a different protocol is appropriate to a currently served group of WDs (e.g., an area previously serving mobile devices is not primarily serving IoT devices).

In various embodiments, each device type may be associated with a respective bandwidth requirement based upon device capability, device purpose/application and the like. For example, user terminals such as supporting voice communications require more bandwidth than an IoT device that periodically transmits the temperature of a room or the stress imparted to a sensor in a bridge or building. The bandwidth available to the CBSD (e.g., 100 MHz at each of three sectors) is divided among the device types via time interleaving or slotting the coverage zones to thereby time interleave or slot access to the CBSD for each device type.

In various embodiments, each device type is allocated a respective portion of the available bandwidth, such as 60% for user terminals/mobile devices (e.g., 65 MHz of 100 MHz), 35% for fixed wireless devices (e.g., 35 MHz of 100 MHz), and 5% for IoT devices (e.g., 5 MHz of 100 MHz). Other allocations may be made depending on the expected traffic of the various WDs to be services. In various embodiments, each device type is associated with respective minimum and normal bandwidth requirements. For example, different QoS requirements may be defined for each device group, and denoted as a QoS class. Depending upon device capabilities, device purpose and so on, each WD group or type may have a respective or different QoS class. Each QoS class may be associated with one or more of respective requirements, such as peak and/or sustained download throughput, peak and/or sustained upload throughput, upload and/or download data transmission latency, minimum service intervals, and/or other requirements. For instance, regular cell phone traffic, or mobile user traffic may require a 25 Mbps DL throughput requirement, 10 Mbps UL throughput requirement, and a maximum 10 millisecond DL data transmission latency. Similarly, IoT sensors may require a minimum 10 Mbps DL throughput requirement, and 20 Mbps UL throughput requirement, and a maximum 5 millisecond UL data transmission latency.

At step 250 a determination is made as to whether additional CZs are to be created. If not, then the method 200 proceeds to step 260. If yes, then steps 230 and 240 are repeated for each subsequent CZ. For example, a second CZ is created using a second PCI (e.g., PCI 120) and configured for a second device type, and a third CZ is created using a third PCI (e.g., PCI 150) and configured for a third device type.

At step 260, the bandwidth sufficiency of one or more of the coverage zones is periodically or detected or otherwise determined. For example, given an initial allocation of BW at step 240, are each of the WD type groups being adequately served or is their congestion such that the allocation is not sufficient or becoming insufficient (e.g., trending toward congestion as indicated by a BW utilization level above a threshold amount such as 90% of allocation). Another BW issue is allocation of BW to a device type that is no longer of interest or that does not need the allocated bandwidth.

At step 270, any appropriate adjustments to the current bandwidth allocation, protocol, and/or coverage zone requirements (e.g., should a CZ be deleted or a new one added?). The method 200 then proceeds to step 250.

In a first example, assume that a 110-3 such as depicted in FIG. 1 comprises three sectors S1-S3 where each sector simultaneously communicates via three time-interleaved (slotted) coverage zones CZ-1 (PCI 100 for user terminals), CZ-2 (PCI 120 for fixed wireless devices) and CZ-3 (PCI 150 for IoT devices), and initial bandwidth allocations of 50%, 40%, and 10%.

The time slots for this example may be sequential in that time is divided into a contiguous sequence of three repeating time chunks or slots, each time chunk or slot having a respective duration, which may be calculated according to percentage allocations, type of wireless device to be serviced, type of protocol to be used and so on. However, since this is likely to be suboptimal, various embodiments contemplate that each time unit is divided into multiple contiguous chunks of time according to the percentage allocations. In further embodiments, each time unit is divided into multiple non-contiguous time chunks or slots, where priority/preference may be given to device types deemed to be more important that others, or specific devices deemed to be conveying very important information. In various embodiments, there is always one active coverage zone at any given time or time slot. In various embodiments, one or more "dormant" or "inactive" time chunks or slots are contemplated, during which none of the coverage zones are active.

Generally speaking, the time slots allocated to the various sectors and/or to servicing the various coverage zones may be of very short duration (e.g., several microseconds), very long duration (e.g., minutes), and/or any other duration appropriate to the wireless devices, communications protocols, and application or use case associated with the embodiment. Further, the slots may be configured as the same duration for each slot, different durations for each slot, or some combination of common and differing durations.

In a second example, assume that each of the three sectors S1-S3 depicted above with respect to FIG. 1 are used to support five different coverage zones (e.g., for processing mobile phone communications via respective cyclical 10 mS or other duration time slots), and two of the sectors (e.g., S2-S3) are further used to support a sixth coverage zone (e.g., for occasionally processing IoT sensor communications via a less frequent 10 mS or other duration time slot).

Table 1 depicts time-slotted coverage zone usage suitable for use in implementing the exemplary coverage zone requirements for the second example. It is noted that first sector S1 is illustratively allocated to a different coverage zones for each subsequent $6^{th}$ time slot (e.g., CZX is rotated among CZ1, C2, CZ3, CZ4, CZ5 during each occurrence of the $6^{th}$ time slot).

TABLE 1

| Slot # | S1 | S2-S3 |
|---|---|---|
| 1 | CZ1 | CZ1 |
| 2 | CZ2 | CZ2 |
| 3 | CZ3 | CZ3 |
| 4 | CZ4 | CZ4 |
| 5 | CZ5 | CZ5 |
| 6 | CZX | CZ6 |
| 1 | CZ1 | CZ1 |
| 2 | CZ2 | CZ2 |
| 3 | CZ3 | CZ3 |
| 4 | CZ4 | CZ4 |
| 5 | CZ5 | CZ5 |
| 6 | CZX | CZ6 |
| 1 | CZ1 | CZ1 |
| 2 | CZ2 | CZ2 |

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method of defining coverage zones at provider equipment (PE) configured for wireless communication via a shared use spectral region managed by a Spectrum Access System (SAS), the method comprising:
   registering the PE with a Spectrum Access System (SAS);
   transmitting, at the PE, a common physical cell identity (PCI) from each of a plurality of available sectors;
   creating, at the PE, a first coverage zone by transmitting a selected first PCI to each of the plurality of available sectors during a first time slot;
   creating, at the PE, a second coverage zone by transmitting a selected second PCI to each of the plurality of available sectors during a second time slot;
   wherein each coverage zone is configured for use by a respective type of equipment.

2. The method of claim 1, wherein the types of equipment comprise user terminals, and fixed wireless access devices.

3. The method of claim 1, further comprising: at the PE, creating a third coverage zone by transmitting a selected third PCI to each of the plurality of available sectors during a third time slot.

4. The method of claim 3, wherein the types of equipment comprise user terminals, fixed wireless access devices, and Internet-of-Things (IoT) devices.

5. The method of claim 1, wherein transmitting one PCI from each of the plurality of available sectors uses substantially an entirety of bandwidth of the available sectors.

6. The method of claim 5, wherein said plurality of available sectors comprises all sectors.

7. The method of claim 1, wherein said shared use spectral region comprises a Citizens Broadband Radio Service (CBRS) spectral region.

8. The method of claim 1, wherein the PE comprises a Citizens Broadband Radio Service Device (CBSD) comprising a plurality of antennas supporting respective sectors.

9. The method of claim 4, wherein each time slot has associated with it a respective duration selected to allocate, to the time slot, bandwidth sufficient to service equipment using the time slot.

10. The method of claim 9, wherein the duration of at least one time slot is periodically adjusted in response to imbalances in bandwidth utilization levels of at least a portion of the time slots.

11. The method of claim 1, wherein each time slot is associated with a respective minimum duration selected to allocate to the time slot a minimum bandwidth to service equipment using the time slot.

12. The method of claim 9, wherein a protocol associated with communications via at least one time slot is periodically adjusted in response to a determination that a different protocol is appropriate to a currently served group of WDs.

13. The method of claim 1, wherein each of a plurality of PE operates in a coordinated manner to form a multiple-node wireless network suitable for delivering networking services to subscribers.

14. The method of claim 13, wherein coverage zones of deployed PE are configured to avoid interfering with coverage zones of adjacent deployed PE.

15. The method of claim 1, wherein each coverage zone is configured for use in accordance with a Quality of Service (QoS) class.

16. The method of claim 15, wherein each QoS class defines one or more of download throughput, upload throughput, and data transmission latency.

17. An apparatus, comprising:
   a Citizens Broadband Radio Service Device (CBSD), comprising antennas supporting radio frequency (RF) communications via respective sectors and a controller configured to register the CBSD with a Spectrum Access System (SAS), the controller further configured for:
   creating a first coverage zone by transmitting a selected first physical cell identity (PCI) to each of the plurality of available sectors during a first time slot;
   creating a second coverage zone by transmitting a selected second PCI to each of the plurality of available sectors during a second time slot;
   wherein each coverage zone is configured for use by a respective type of equipment.

18. The apparatus of claim 17, wherein said CBSD comprises one of a plurality of CBSDs deployed to locations proximate existing provider equipment (PE) to form thereby a multiple-node wireless network suitable for delivering networking services to subscribers.

19. The apparatus of claim 18, wherein coverage zones of deployed CBSDs are configured to avoid interfering with coverage zones of adjacent deployed CBSDs.

20. The apparatus of claim 17, wherein each coverage zone is configured for use in accordance with a corresponding Quality of Service (QoS) class, wherein each QoS class defines one or more of download throughput, upload throughput, and data transmission latency.

21. The apparatus of claim 17, wherein the controller is further configured for creating a third coverage zone by transmitting a selected third PCI to each of the plurality of available sectors during a third time slot.

22. The apparatus of claim 17, wherein transmitting one PCI from each of the plurality of available sectors uses substantially an entirety of bandwidth of the available sectors.

23. The apparatus of claim 17, wherein each time slot has associated with it a respective duration selected to allocate, to the time slot, bandwidth sufficient to service equipment using the time slot.

24. The apparatus of claim 23, wherein the duration of at least one time slot is periodically adjusted in response to imbalances in bandwidth utilization levels of at least a portion of the time slots.

25. The apparatus of claim 17, wherein each time slot is associated with a respective minimum duration selected to allocate to the time slot a minimum bandwidth to service equipment using the time slot.

26. The apparatus of claim 23, wherein a protocol associated with communications via at least one time slot is periodically adjusted in response to a determination that a different protocol is appropriate to a currently served group of WDs.

* * * * *